United States Patent
Zhao et al.

(10) Patent No.: US 11,681,447 B2
(45) Date of Patent: Jun. 20, 2023

(54) METHOD, DEVICE AND COMPUTER PROGRAM PRODUCT OF BALANCE OF STORAGE SPACE FOR FILE SYSTEM

(71) Applicant: EMC IP Holding Company LLC, Hopkinton, MA (US)

(72) Inventors: Chaojun Zhao, Chengdu (CN); Yang Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 123 days.

(21) Appl. No.: 16/877,910

(22) Filed: May 19, 2020

(65) Prior Publication Data

US 2021/0132829 A1 May 6, 2021

(30) Foreign Application Priority Data

Oct. 30, 2019 (CN) .......................... 201911046051.7

(51) Int. Cl.
*G06F 3/06* (2006.01)

(52) U.S. Cl.
CPC .......... *G06F 3/0631* (2013.01); *G06F 3/0614* (2013.01); *G06F 3/0653* (2013.01); *G06F 3/0659* (2013.01); *G06F 3/0673* (2013.01)

(58) Field of Classification Search
CPC ........... G06F 3/06–0689; G06F 3/0631; G06F 3/0614; G06F 3/0653; G06F 3/0659; G06F 3/0673
See application file for complete search history.

(56) References Cited

U.S. PATENT DOCUMENTS

| 9,355,121 | B1* | 5/2016 | Scheer | G06F 16/185 |
|---|---|---|---|---|
| 9,678,683 | B1* | 6/2017 | Chen | G06F 9/50 |
| 9,870,366 | B1* | 1/2018 | Duan | G06F 3/0608 |
| 10,235,286 | B1 | 3/2019 | Yu et al. | |
| 10,936,195 | B2 | 3/2021 | Liu et al. | |
| 2018/0260131 | A1* | 9/2018 | Lowry | G06F 3/067 |
| 2020/0226035 | A1* | 7/2020 | Li | G06F 11/1446 |

OTHER PUBLICATIONS

Lømo, Bjørn Erik. File System supporting Arbitrarily sized Allocations. MS thesis. 2008. (Year: 2008).*
Li, Yang, Li Guo, and Yike Guo. "An efficient and performance-aware big data storage system." International Conference on Cloud Computing and Services Science. Springer, Cham, 2012. (Year: 2012).*
Mesnier, Michael, et al. "Differentiated storage services." Proceedings of the twenty-third acm symposium on operating systems principles. 2011. (Year: 2011).*
Brandt, Scott A., et al. "Efficient metadata management in large distributed storage systems." 20th IEEE/11th NASA Goddard Conference on Mass Storage Systems and Technologies, 2003.(MSST 2003). Proceedings.. IEEE, 2003. (Year: 2003).*

* cited by examiner

*Primary Examiner* — Nicholas J Simonetti
(74) *Attorney, Agent, or Firm* — BainwoodHuang

(57) ABSTRACT

Techniques provide storage space balance for a file system. Along these lines, it is determined whether a first allocation proportion of a first metadata storage space of a first type of metadata from among one or more types of metadata of a file system is greater than a first threshold proportion. If the first allocation proportion is greater than the first threshold proportion, a metadata storage space is reserved for the first type of metadata from a storage space of the file system.

18 Claims, 6 Drawing Sheets

METHOD, DEVICE AND COMPUTER PROGRAM PRODUCT OF BALANCE OF STORAGE SPACE FOR FILE SYSTEM

CROSS-REFERENCE TO RELATED APPLICATION

This application claims priority to Chinese Patent Application No. CN201911046051.7, on file at the China National Intellectual Property Administration (CNIPA), having a filing date of Oct. 30, 2019, and having "METHOD, DEVICE AND COMPUTER PROGRAM PRODUCT OF BALANCE OF STORAGE SPACE FOR FILE SYSTEM" as a title, the contents and teachings of which are herein incorporated by reference in their entirety.

FIELD

Embodiments of the present disclosure generally relate to computer technologies, and more specifically to a method, device and computer program product of storage space balance for a file system.

BACKGROUND

Metadata and data are widely used in modern file systems. There are different types of metadata for describing various features of files. Inodes are a very important type of metadata, and each inode corresponds to a file system object in the file systems to save file information such as access permissions, an owner, timestamps and a storage location of a file. In addition to the inodes, there are other types of metadata in the file systems. For instance, virtual blocks may act as metadata blocks for Inline Compression and Deduplication.

For a thin file system, a storage space is allocated on demand. However, a storage space of certain metadata such as inodes is allocated statically when the file system is initially created. However, as the allocation of the storage space for the file system changes with the varying user workloads, the data layout may have changed significantly. For instance, if a large number of small files and directories are created, a consumption speed of the inode blocks may be fast, while the consumption speed of the data blocks may be slow. Imbalances may occur between a storage space of the inode blocks and a storage space of the data blocks, which may be worse as time elapses.

SUMMARY

In general, embodiments of the present disclosure provide a method, device and computer program product of storage space balance for a file system.

In a first aspect, embodiments of the present disclosure provide a method of storage space balance for a file system. In the method, it is determined whether a first allocation proportion of a first metadata storage space for a first type of metadata from among one or more types of metadata of the file system is greater than a first threshold proportion. If the first allocation proportion is greater than the first threshold proportion, a metadata storage space is reserved for the first type of metadata from a storage space for the file system.

In a second aspect, embodiments of the present disclosure provide a device of storage space balance for a file system. The device includes a processor and a memory storing computer-executable instructions. The computer-executable instructions, when executed by the processor, cause the device to perform acts, the acts including: determining whether a first allocation proportion of a first metadata storage space for a first type of metadata from among one or more types of metadata of the file system is greater than a first threshold proportion; and in accordance with a determination that the first allocation proportion is greater than the first threshold proportion, reserving a metadata storage space for the first type of metadata from a storage space for the file system.

In a third aspect, embodiments of the present disclosure provide a computer program product tangibly stored on a non-transitory computer-readable medium and including machine-executable instructions. The machine-executable instructions, when executed, cause the machine to perform the method according to the first aspect.

It should be appreciated that the content described in the summary section is not intended to identify key or essential features of embodiments of the present disclosure, nor is it intended to limit the scope of the present disclosure. Other features of the present disclosure will become easily comprehensible through the following description.

BRIEF DESCRIPTION OF THE DRAWINGS

In conjunction with the accompanying drawings and with reference to the following detailed description, the above and other features, advantages and aspects of embodiments of the present disclosure will become more apparent. In the drawings, the same or similar reference numbers represent the same or similar elements, wherein.

DETAILED DESCRIPTION OF EMBODIMENTS

Figure 1:
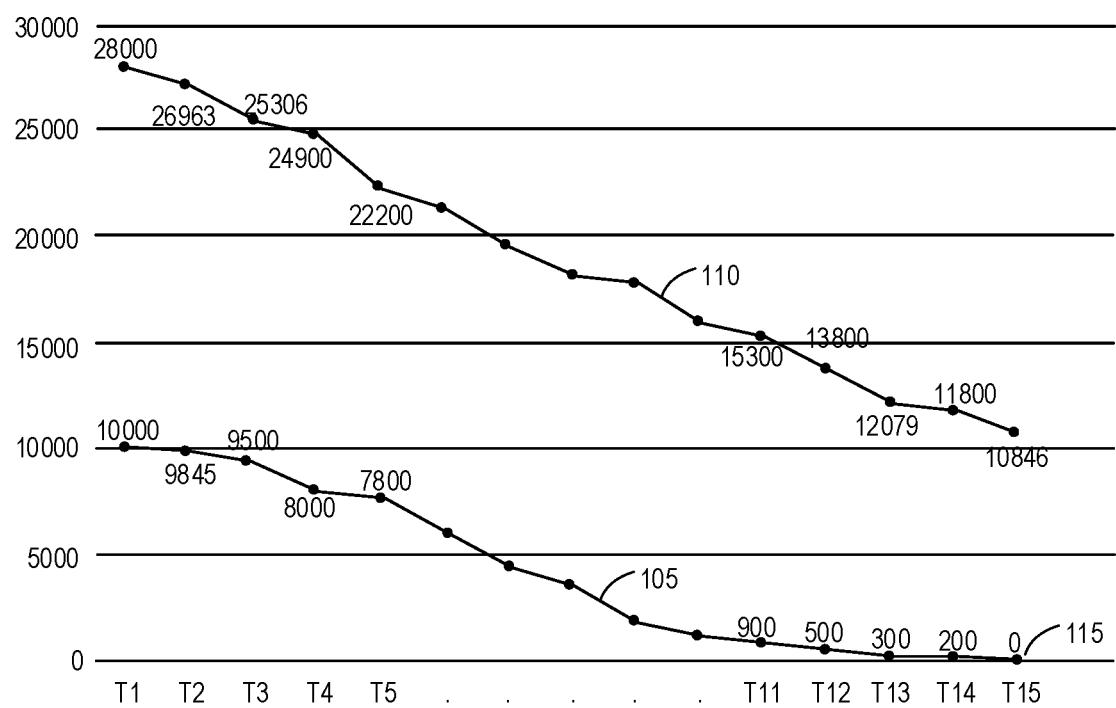
FIG. 1 illustrates imbalance between a storage space of metadata blocks and a storage space of data blocks.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described below in more detail with reference to the accompanying drawings. Although some embodiments of the present disclosure are illustrated in the drawings, it is to be understood that the present disclosure may be implemented through various forms, but may not be interpreted as being limited to the embodiments illustrated herein. On the contrary, these embodiments are only provided for more thorough and complete understanding of the present disclosure. It is to be understood that the accompanying drawings and embodiments of the present disclosure are only for the purpose of illustration, without suggesting any limitation of the protection scope of the present disclosure.

As used herein, the terms "includes" and its variants should be understood as open terms that mean "includes, but is not limited to." The term "based on" is to be read as "based at least in part on." The term "one embodiment" and "an embodiment" are to be read as "at least one embodiment." The term "another embodiment" is to be read as "at least one further embodiment". Relevant definitions of other terms will be given in the following descriptions.

As used herein, the terms "first", "second" and the like used herein may be used to describe various elements, and these elements should not be limited by these terms. These terms are only used to distinguish one element from another. For example, without departing from the scope of the example embodiments, a first element may be referred to as a second element, and similarly, a second element may be referred to as a first element. As used herein, the term "and/or" includes any and all combinations of one or more of the listed terms.

As stated above, a storage space of certain metadata such as inodes is allocated statically when the file system is initially created. Therefore, as the allocation and usage of the storage space for the file system has changed, an imbalance occurs between the storage space of the metadata blocks and the storage space of the data blocks. However, conventional static allocation approaches of a storage space for the metadata do not consider such an imbalance between the usage of the metadata blocks and the data blocks, which causes a waste of the storage space for the file system. For example, the metadata blocks (such as inodes) have been used, while a large number of data blocks still remain. This will cause data unavailability (DU), but a free space visible to users still exists at this time.

FIG. 1 illustrates such an imbalance between a storage space of the metadata blocks and a storage space of the data blocks. In FIG. 1, a curve 105 and a curve 110 represent consumption of the metadata blocks and the data blocks over time, respectively. As shown in FIG. 1, the consumption speed of the metadata blocks is imbalanced with the consumption speed of the data blocks. The metadata blocks will be used up at time 115 (labeled as T15), but there are still many data blocks available at this time.

Such an imbalance will cause a data unavailable (DU) state for users. Although the file system is not completely unavailable from a graphical user interface (GUI) or a command line interface (CLI), users cannot create any new files and/or directories. At this time, even if there is a free space in the file system, a storage administrator has to expand the file system to increase a space available for the metadata blocks, which seriously reduces the storage efficiency.

Embodiments of the present disclosure propose a self-balance scheme between a metadata storage space and a data storage space for a file system to avoid occurrence of a DU situation and improve the storage efficiency of the file system. This scheme reserves a storage space for a certain type of metadata of a file system when an allocation proportion of a corresponding metadata storage space for this type of metadata is high. In this way, the metadata storage space and the data storage space may be balanced by storage space reuse without a need for expanding the file system.

According to this scheme, the metadata blocks will be dynamically allocated to automatically adapt to changes in user workloads, thereby reducing the previous work of a storage administrator for file system layout planning. In addition, this scheme may also avoid the DU situation due to the imbalance of the metadata storage and data storage spaces in the file system, improve the storage space efficiency of the file system and save the cost of expanding the storage array for the file system.

Figure 2:
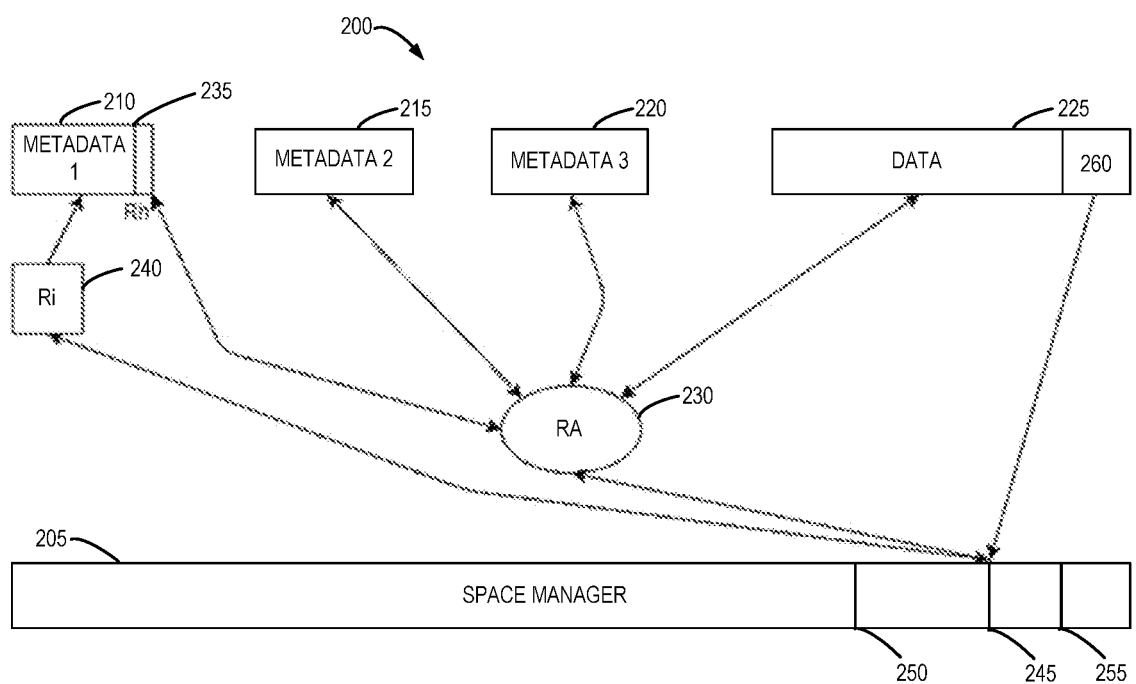
FIG. 2 illustrates an example environment in which embodiments of the present disclosure may be implemented.

FIG. 2 illustrates an example environment 200 in which embodiments of the present disclosure may be implemented.

The environment 200 includes a space manager (SM) 205 responsible for dynamic management of metadata and data storage spaces in a storage space for a file system. The space manager 205 may be implemented in software, firmware, hardware or any combination thereof.

In the space manager 205, metadata storage spaces 210, 215 and 220 are configured for three corresponding types of metadata of the file system. For the purpose of discussion, the three types of metadata will be referred to as a first type of metadata (labeled as metadata 1), a second type of metadata (labeled as metadata 2) and a third type of metadata (labeled as metadata 3), and the corresponding metadata storage spaces are referred to as a first metadata storage space 210, a second metadata storage space 215 and a third metadata storage space 220, respectively.

It is to be understood that three types of metadata and corresponding three metadata storage spaces are shown in FIG. 2 only for the purpose of illustration. In implementations, the file system may include any number of metadata types and corresponding metadata storage spaces.

As shown in FIG. 2, in addition to the metadata storage spaces, a data storage space 225 is also allocated for the file data in the space manager 205. The metadata storage spaces 210, 215 and 220 and the data storage space 225 may be of any size, for example, including any number of storage blocks.

According to the embodiments of the present disclosure, in order to avoid the situation that while the metadata storage spaces are exhausted, some data blocks are still available, that is, the storage space is still shown to be available to the user in the file system, a reservation agent (RA) 230 is introduced into the file system. Similar to the space manager 205, the reservation agent 230 may also be implemented in software, firmware, hardware, or any combination thereof.

The reservation agent 230 is invoked or initiated when necessary (for example, when the metadata blocks will be used up earlier than the data blocks), so as to reserve a metadata storage space for the metadata in the space manager 205. The reserved metadata storage space will be used to store metadata only, but not used to store the data. In other words, the reserved metadata storage space will be used to first meet a space allocation request for the metadata blocks. In this way, the DU issue may be avoided for users.

The reserved metadata storage space may be of any size. In some embodiments, the reserved metadata storage space may include a storage slice (for example, 256 MB), which may also be referred to as a Metadata Reserved Slice (or MRS). An example data structure of an MRS will be discussed below.

| Metadata Reserved Slice { | |
|---|---|
| Slice Id | /Unique identification (ID) for a slice |
| Seqid | /Sequence ID which may be incremented monotonically when an MRS is reserved |
| id | /Metadata ID for which an MRS is reserved |
| Duration | /Time duration for which an MRS is reserved and which will be reset to 0 whenever an MRS block is allocated |

In various embodiments of the present disclosure, if an allocation proportion of the first metadata storage space 210 exceeds a threshold proportion 235 (represented by Rh), the reservation agent 230 reserves a metadata storage space 240, represented by Ri, for the corresponding first type of metadata. For the purpose of discussion, the threshold proportion 235 will be referred to as a first threshold proportion 235. The specific value of the first threshold proportion 235 depends on actual needs, which may be fixed or configured dynamically. As an example, the first threshold proportion 235 may be set to 90%.

The allocation proportion of a metadata storage space may be determined by the proportion of an allocated part of the metadata storage space. For example, the following formula (1) may be used to determine whether the reserved metadata storage space is to be created:

$$\text{Allocated Part of Metadata Storage Space/Metadata Storage Space} > Rh \quad (1)$$

In some embodiments, the determination of the allocation proportion of the metadata storage space may be triggered based on the usage of the file system. For example, the comparing of the allocation proportion of the metadata storage space with the first threshold proportion 235 may be triggered when the allocation proportion of the storage space for the file system is greater than or equal to a threshold proportion 245 (referred to as a second threshold proportion 245). Similar to the first threshold proportion 235, the second threshold proportion 245 may be determined by the proportion of an allocated part of the storage space for the file system.

In some embodiments, a plurality of threshold proportions may be set in the space manager 205. For example, as shown in FIG. 2, in addition to the second threshold proportion 245, a lower threshold proportion 250 and a higher threshold proportion 255 may be set, which will be referred to as a third threshold proportion 250 and a fourth threshold proportion 255, respectively.

Figure 3:
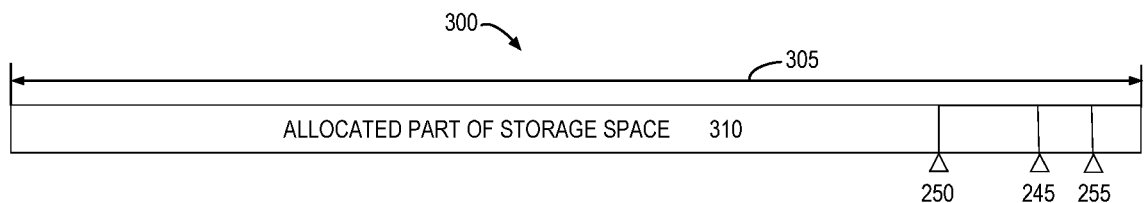
FIG. 3 illustrates an example setting of threshold proportions for storage space allocation of a file system according to some embodiments of the present disclosure.

FIG. 3 illustrates an example setting 300 of the threshold proportions for the storage space allocation of a file system according to some embodiments of the present disclosure.

As shown in FIG. 3, according to the proportion of the allocated part 310 of the storage space 305 for the file system, the second threshold proportion 250, the third threshold proportion 245 and the fourth threshold proportion 255 are set, which may be implemented as a low water mark (LWM), a middle water mark (MWM) and a high water mark (HWM), for example. Similar to the first threshold proportion 235, the specific values of the second threshold proportion 245, the third threshold proportion 250 and the fourth threshold proportion 255 may also depend on actual needs. As an example, the second threshold proportion 245 may be set to 90%, the third threshold proportion 250 may be set to 80%, and the fourth threshold proportion 255 may be set to 95%.

Figure 4:
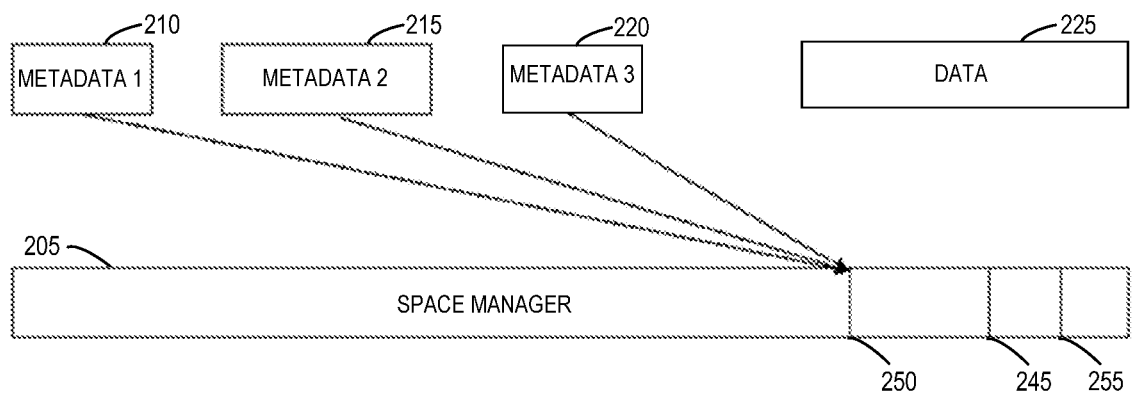
FIG. 4 illustrates an example process of allocating a metadata storage space from a storage space of a file system according to some embodiments of the present disclosure.

When the proportion of the allocated part 310 of the storage space reaches the different threshold proportions, the space manager 205 will allocate the storage blocks for the file system in different ways. For example, when the proportion of the allocated part 310 is less than or equal to the third threshold proportion 250 (for example, the low water mark), metadata storage spaces may be allocated for the respective types of metadata 210, 215 and 220 from the storage space 305 in a conventional manner, as shown in FIG. 4.

When the proportion of the allocated part 310 of the storage space is greater than or equal to the second threshold proportion 245 (for example, the middle water mark), as shown in FIG. 2, the reservation agent 230 will be initialized or invoked to reserve a storage unit for the metadata. The reservation agent 230 may compare the first threshold proportion 235 with each of the allocation proportions of the respective storage spaces 210, 215 and 220 for the types of metadata. If the allocation proportion of the corresponding storage space of a certain type of metadata exceeds the first threshold proportion 235, the reservation agent 230 reserves a metadata storage space (such as a 256 MB slice) for the type of metadata. In the example as shown in FIG. 2, only the allocation proportion of the first metadata storage space 210 for the first type of metadata exceeds the first threshold proportion 235, and therefore the storage space 240 is only reserved for the first type of metadata.

In some embodiments, different priorities may be assigned to different types of metadata. In the case where the allocation proportions of the corresponding storage spaces for a plurality of types of metadata exceed the first threshold proportion 235, the reservation of the storage space may be prioritized for the type of metadata with a higher priority. The priorities may be determined based on current allocation states of the respective storage spaces for the types of metadata, consumption speeds of the respective storage spaces of the types of metadata and the like. A higher priority may be assigned to the metadata for which the storage space is most likely used up first.

For example, when the current allocation proportion of the storage space for the file system reaches the second threshold proportion 245, the reservation agent 230 may create a reserved metadata storage space. Then, the reservation agent 230 may check the current allocation states and consumption speeds of the metadata and data blocks. If an imbalance occurs between a certain type of metadata blocks and the data blocks, a storage block may be first allocated for the imbalanced type of metadata in the reserved storage space. In this way, the use efficiency of the storage space may be further improved.

In some embodiments, after a metadata storage space (such as the storage space 240) is reserved for a certain type of metadata (such as the first metadata 210), the reservation agent 230 may determine whether a reservation condition is satisfied, for example, whether the above formula (1) still holds. If the reservation condition is not met, the reserved storage space (for example, the storage space 240) will be released.

In addition to the above formula (1), any other suitable reservation conditions may be adopted according to actual needs. In some embodiments, the determination of whether to maintain the reserved storage space may reply on the proportion of the allocated part 310 of the storage space 305 for the file system. For example, if the proportion of the allocated part 310 is lower than the third threshold proportion 250 (for example, the low water mark) again, all parts of the metadata storage space reserved for the metadata will be returned to the space manager 205. At this time, the reservation agent 230 is stopped, and a storage space may be allocated for the metadata from the storage space 305 of the file system in a conventional manner.

In order to further facilitate the rebalance between the metadata storage space and the data storage space, in some embodiments, a part of the data storage space that has not been accessed within a predetermined time period may be reclaimed from the allocated data storage space for the file system. For example, as shown in FIG. 2, the reservation agent 230 may scan the allocated data storage space 225 and reclaim a part 260 of the data storage space that has not been accessed within the predetermined time period for reservation to the metadata for subsequent use. As an example, the reservation agent 230 may reclaim the least recently used (LRU) free backend data blocks that are already allocated on the disk but not used by the users.

In this way, the free space in the data blocks will be actively reclaimed to the space manager 205 such that the space in the file system may be released from the data blocks to the metadata blocks. The fragment level of the file system may be reduced, and the storage efficiency of the file system may be improved. By reserving the metadata storage space for the metadata and reclaiming a free data storage space for reservation to the metadata for subsequent use, automatic allocation rebalance between the metadata and data storage spaces may be implemented without a need for expanding the storage space for the file system.

If the reserved metadata storage space has been sufficiently used while the allocation proportion of the storage space for the metadata still exceeds the first threshold proportion 235, the reservation of a new metadata storage space may be carried out for the metadata. The above-mentioned process may be adopted, and the details thereof will not be repeated herein.

When the proportion of the allocated part 310 of the data storage space is greater than or equal to the fourth threshold proportion 255 (for example, the high water mark), it is indicated that the space in the space manager 205 is limited. At this time, the reserved metadata storage space may be released. A specific example will be discussed below with reference to FIG. 5.

Figure 5:
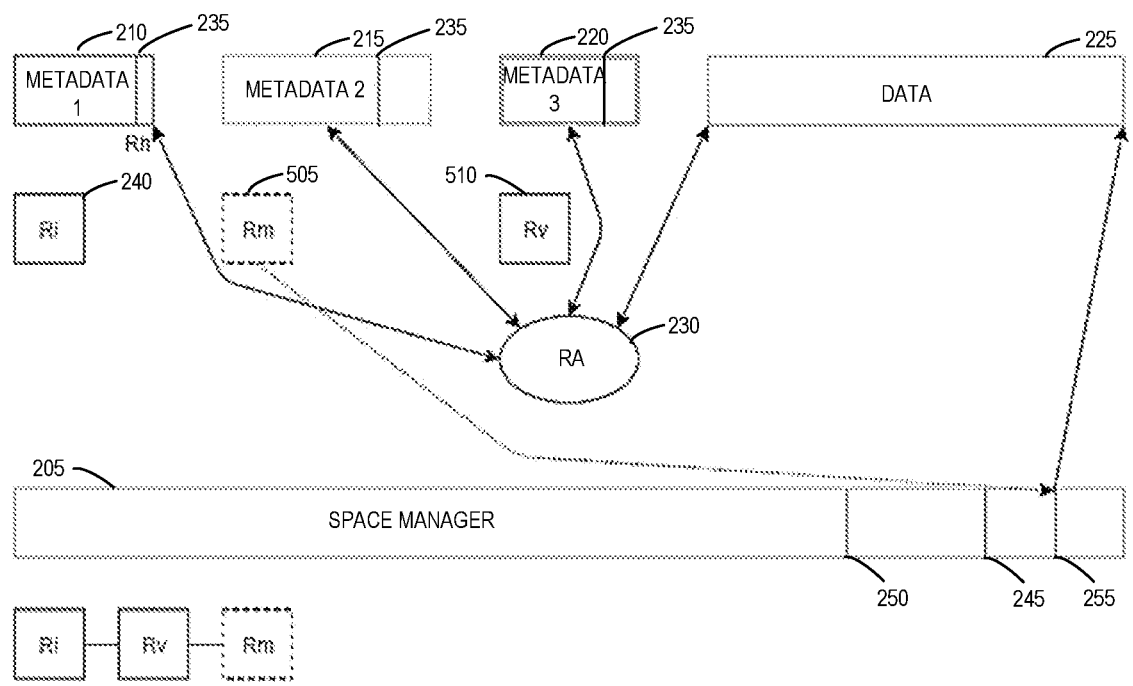
FIG. 5 illustrates an example process of releasing a storage space reserved for the metadata according to some embodiments of the present disclosure.

In this example, as shown in FIG. 5, the allocation proportion of the second metadata storage space 215 for the second type of metadata (labeled as metadata 2) and the allocation proportion of the third metadata storage space 220 for the third type of metadata (labeled as metadata 3) both exceed the first threshold proportion 235 (for example 90%). Therefore, metadata storage spaces 505 and 510 are also reserved for these two types of metadata, which are represented as Rm and Rv, respectively.

If the reservation agent 230 monitors that the proportion of the allocated part of the storage space for the file system exceeds the fourth threshold proportion 255 (for example, more than 95%), it is indicated that the storage space for the file system is limited. At this time, the reservation agent 230 may determine whether there is a reclaimable part of data storage space, for example, whether a part of data storage space has not been accessed within a predetermined time period. As an example, the reservation agent 230 may scan the data space once in a predetermined time interval (for example, 2 minutes) for reclaimable data blocks.

If the data blocks will be used up earlier than the metadata blocks, the reservation agent 230 will not be able to reclaim any block from the data space to the space manager 205. In the space manager 205, there is no space or block available other than the reserved metadata storage space. In this case, the reservation agent 230 may release the reserved metadata storage space.

In the example shown in FIG. 5, the reservation agent 230 selects, from a plurality of reserved metadata storage spaces 240, 505 and 510, a storage space to be released. For example, based on generation states of the respective reserved metadata storage spaces, a reserved metadata storage space that is less likely to be used up in the near future may be selected and released. As an example, the generation state of a reserved metadata storage space may be determined according to the following formula (2):

$$MGS_i = \text{Seqid/Duration} \times (1 - \text{Free Space/Allocated Space}) \quad (2)$$

where $MGS_i$ (i=1, 2, 3 ...) represents the generation state of the ith MRS.

Moreover, the reservation agent 230 may cause an alert to indicate that the storage space for the file system is limited, and/or the metadata storage space has a higher utilization rate. Therefore, the storage administrator or the user may be notified that the storage space rebalance cannot be implemented for the file system, and the storage administrator or the user may take the corresponding acts.

Figure 6:
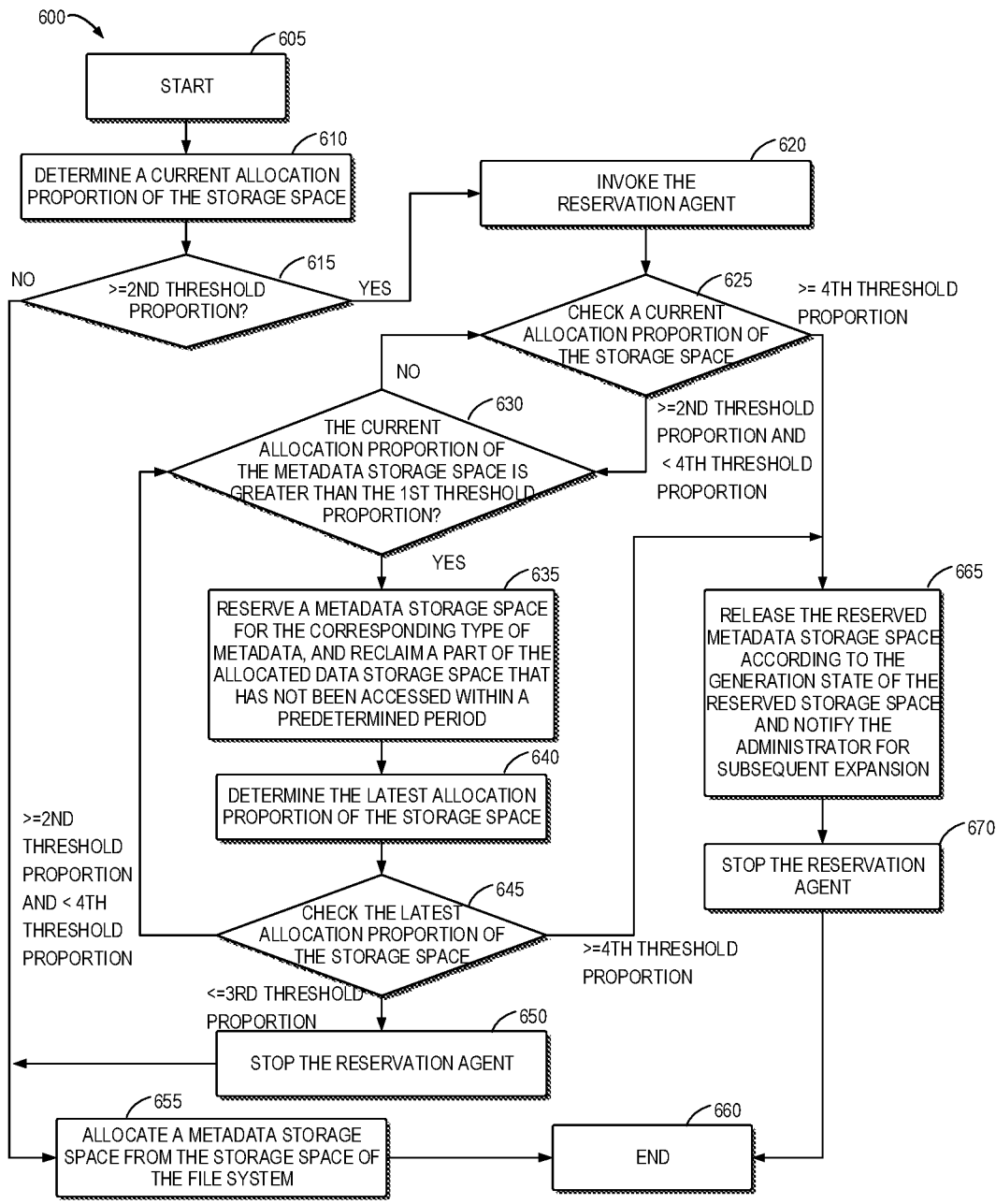
FIG. 6 illustrates a flowchart of an example process for balancing metadata and data storage spaces according to some embodiments of the present disclosure.

FIG. 6 illustrates a flowchart of an example process 600 for balancing the metadata and data storage spaces according to some embodiments of the present disclosure.

As shown in FIG. 6, the process 600 starts at block 605. At block 610, a current allocation proportion of the storage space for the file system is determined. At block 615, it is determined whether the current allocation proportion of the storage space is greater than or equal to the second threshold proportion 245 (for example, the middle water mark). If the current allocation proportion of the storage space is greater than or equal to the second threshold proportion 245, the process 600 proceeds to block 620 where the reservation agent 230 is invoked. At block 625, a current allocation proportion of the storage space for the file system is checked. If the current allocation proportion of the storage space is greater than or equal to the second threshold proportion 245 and less than the fourth threshold proportion 255 (for example, the high water mark), the process 600 proceeds to block 630 where it is determined whether the current allocation proportion of the metadata storage space is greater than the first threshold proportion 235. If the current allocation proportion of the metadata storage space is greater than the first threshold proportion 235, a metadata storage space is reserved for the corresponding type of metadata at block 635, and a part of the allocated data storage space that has not been accessed within a predetermined time period is reclaimed.

At block 640, the latest allocation proportion of the storage space for the file system is determined. Then, the latest allocation proportion of the storage space is checked at block 645. If the latest allocation proportion of the storage space is still greater than or equal to the second threshold proportion 245 and less than the fourth threshold proportion 255, the process 600 returns to block 630 to continue the determination of the allocation proportion of the metadata storage space. If the latest allocation proportion of the storage space is less than or equal to the third threshold proportion 250 (for example, the low water mark), the reservation agent 230 is stopped at block 650. Further, at block 655, a metadata storage space is allocated from the storage space of the file system. At block 660, the process 600 ends.

If it is determined at block 645 that the latest allocation proportion of storage space is greater than or equal to the fourth threshold proportion 255, the process 600 proceeds to block 665 where the reserved metadata storage space is released according to the generation state of the reserved storage space, and the administrator is notified for subsequent expansion. Then, at block 670, the reservation agent 230 is stopped. Further, the process 600 ends at block 660.

The changing usages of the metadata blocks and data blocks in a 100 GB thin file system is shown in Table 1 as below.

TABLE 1

| Time | Allocated metadata blocks | Allocated data blocks | Free backend data blocks | Unallocated part of storage space | Allocation proportion of storage space |
|---|---|---|---|---|---|
| T1 | 20 GB | 58 GB | 15 GB | 22 GB | 78% |
| T2 | 28 GB | 62 GB | 16 GB | 10 GB | 90% |
| T3 | 32 GB | 62 GB | 2 GB | 6 GB | 94% |
| T4 | 34 GB | 62 GB | 0 GB | 4 GB | 96% |

At time T1, the allocation proportion of the storage space for the file system is 78%, which is less than the third threshold proportion 250 (for example, 80%). At this time, the allocation of the metadata blocks and the data blocks will be implemented in the storage space for the file system in a conventional way.

At time T2, many new small files or directories have been created. The allocation proportion of the storage space for the file system is 90%, which reaches the second threshold proportion 245. At this time, the reservation agent 230 will be initialized or invoked and reserve the MRS for the metadata. At the same time, the reservation agent 230 starts scanning for the LRU free backend data blocks for reclaiming.

At time T3, the metadata blocks are increased with the MRS by 4 GB. Meanwhile, the reservation agent 230 decreases the free backend data blocks 1) to satisfy a new allocation request and 2) to reclaim the LRU free backend data blocks to the MRS for use by the metadata. The rebalance is implemented between the metadata blocks and the data blocks. The metadata blocks are not run out while there are still free backend data blocks in the file system.

At time T4, the allocation proportion of the storage space for the file system is 96%, which exceeds the fourth threshold proportion 255 (for example, 95%). At this time, there is no free backend data block, which means that a rebalance request from the reservation agent 230 cannot be allowed. An alert will be sent to the user to indicate the higher usage of the metadata storage space and the limited storage space of the file system.

Figure 7:
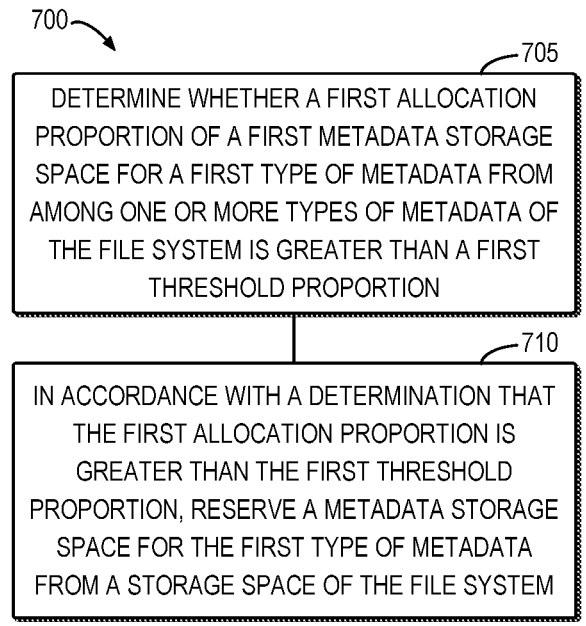
FIG. 7 illustrates a flowchart of an example method of storage space balance for a file system according to some embodiments of the present disclosure.

FIG. 7 illustrates a flowchart of an example method 700 of balancing the storage space for a file system according to some embodiments of the present disclosure. The method 700 may be implemented in the environment 200 as shown in FIG. 2. For ease of discussion, the method 700 will be described below with reference to FIG. 2.

As shown in FIG. 7, at block 705, it is determined whether an allocation proportion (hereinafter referred to as "a first allocation proportion") of a first metadata storage space for a first type of metadata from among one or more types of metadata of a file system is greater than a first threshold proportion. At block 710, if it is determined that the first allocation proportion is greater than the first threshold proportion, a metadata storage space is reserved for the first type of metadata from a storage space of the file system.

In some embodiments, a part of a data storage space allocated for the file system that has not been accessed within a predetermined period of time may be determined. Then, the part of data storage space that has not been accessed may be reclaimed for reservation to one or more types of metadata.

In some embodiments, it may be determined again whether the current allocation proportion of the first metadata storage space for the first type of metadata is greater than the first threshold proportion. If it is determined that the current allocation proportion is less than or equal to the first threshold proportion, the reserved metadata storage space may be released.

In some embodiments, it may be determined whether an allocation proportion (hereinafter referred to as "a second allocation proportion") of a second metadata storage space for a second type of metadata from among the one or more types of metadata is greater than the first threshold proportion. If it is determined that the second allocation proportion is greater than the first threshold proportion, a first priority of the first type of metadata and a second priority of the second type of metadata are compared. If the first priority is higher than the second priority, the reservation of the metadata storage space for the first type of metadata may be prioritized in the storage space for the file system.

In some embodiments, it may be determined whether an allocation proportion (hereinafter referred to as "a third allocation proportion") of the storage space for the file system is greater than or equal to the second threshold proportion. If it is determined that the third allocation proportion is greater than or equal to the first threshold proportion, it is determined whether the first allocation proportion is greater than the first threshold proportion.

In some embodiments, it may be determined whether the third allocation proportion of the storage space for the file system is less than or equal to a third threshold proportion less than the second threshold proportion. If it is determined that the third allocation proportion is less than or equal to the third threshold proportion, the reserved metadata storage space may be released.

In some embodiments, it may be determined whether the third allocation proportion of the storage space for the file system is greater than or equal to a fourth threshold proportion greater than the second threshold proportion. If it is determined that the third allocation proportion is greater than or equal to the fourth threshold proportion, the reserved metadata storage space may be released.

In some embodiments, if it is determined that the third allocation proportion is greater than or equal to the fourth threshold proportion, it may be determined whether one of a plurality of parts of a data storage space allocated for the file system has not been accessed within a predetermined time period. If it is determined that all the parts of the data storage space have been accessed, the reserved storage space may be released. In some embodiments, an alert may also be caused to indicate that the storage space for the file system is limited.

It is to be understood that the operations and features as described above with reference to FIGS. 2 to 5 are also applicable to the method 700 and have the same effect, and the specific details will not be repeated herein.

Figure 8:
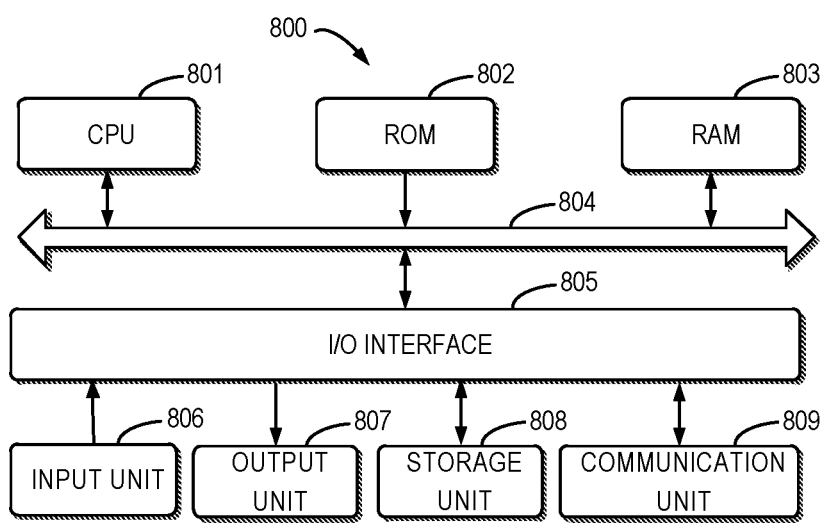
FIG. 8 illustrates a block diagram of a device that is suitable for implementing embodiments of the present disclosure.

FIG. 8 illustrates a block diagram of a device 800 that is suitable for implementing embodiments of the present disclosure.

As shown in FIG. 8, the device 800 includes a controller or a processor, or referred to as a central processing unit (CPU) 801 which is capable of performing various appropriate actions and processing in accordance with programs stored in a read only memory (ROM) 802 and/or a random access memory (RAM) 803. The ROM 802 and/or RAM 803 may store various programs and data required in operations of the device 800. The CPU 801, the ROM 802 and the RAM 803 are connected to one another via a bus 804. Particularly, the device 800 may further include one or more dedicated processing units (not shown) which can be connected to a bus 804.

An input/output (I/O) interface 805 is also connected to the bus 804. A plurality of components in the device 800 are connected to the I/O interface 805: an input unit 806 such as a keyboard, a mouse, or the like; an output unit 807 such as various types of displays and loudspeakers; a storage unit 808 such as a magnetic disk, an optical disk or the like; and a communication unit 809 such as a network card, a modem, a radio communication transceiver. The communication unit 809 allows the device 800 to exchange information/data with other devices via a computer network such as Internet and/or various telecommunication networks. In particular, in the embodiments of the present disclosure, the communication unit 809 supports communication with clients or other devices.

In some embodiments, the CPU 801 may be configured to perform various processes or processing described above, such as the method 700. For example, in some embodiments, the method 700 may be implemented as a computer software program, which is tangibly included in a machine-readable medium such as storage unit 808. In some embodiments, the computer program can be partially or completely loaded and/or installed on the device 800 via the ROM 802 and/or the communication unit 809. When the computer program is loaded to the RAM 803 and executed by the CPU 801, one or more steps of the above method 700 described above may be implemented. Alternatively, in other embodiments, the CPU 801 may also be configured in any other suitable manners to implement the above process/method.

Particularly, according to the embodiments of the present disclosure, the process described with reference to FIG. 1 to FIG. 7 may be implemented as a computer program product which is tangibly stored on a non-transitory computer-readable medium and including machine-executable instructions, the machine-executable instructions, when executed, causing the device to carry out aspects of the present disclosure.

The computer-readable storage medium can be a tangible device that can store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer-readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer-readable storage medium, as used herein, is not to be construed as being transitory signals per se, such as radio waves or other freely propagating electromagnetic waves, electromagnetic waves propagating through a waveguide or other transmission media (such as light pulses passing through a fiber-optic cable), or electrical signals transmitted through a wire.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as "C" language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to block diagrams and/or flowchart illustrations of apparatuses, methods, and computer program products according to embodiments of the disclosure. It will be understood that each block of the flowchart illustrations and/or block diagrams, and combinations of blocks in the flowchart illustrations and/or block diagrams, can be implemented by computer-readable program instructions.

The descriptions of the various embodiments of the present disclosure have been presented for purposes of illustration, but are not intended to be exhaustive or limited to the embodiments disclosed. All modifications and variations without departing from the essence of the present disclosure fall within the protection scope of the present disclosure as defined by the appended claims.

We claim:

1. A method of storage space balance for a file system, comprising:
   determining whether a first allocation proportion of a first metadata storage space for a first type of metadata from among a plurality of types of metadata of the file system is greater than a first threshold proportion; and
   in response to a determination that the first allocation proportion is greater than the first threshold proportion:
   reserving a metadata storage space for the first type of metadata from a storage space of the file system, wherein reserving the metadata storage space for the first type of metadata includes:
   determining whether a second allocation proportion of a second metadata storage space for a second type of metadata from among the plurality of types of metadata is greater than the first threshold proportion, in response to determining that the second allocation proportion is greater than the first threshold proportion, performing a comparison of a first priority of the first type of metadata to a second priority of the second type of metadata, and in response to determining that the first priority is higher than the second priority, prioritizing the reservation of the metadata storage space for the first type of metadata from the storage space of the file system over reservation of metadata storage space for the second type of metadata;

determining a part of a data storage space allocated for the file system, the part of the data storage space having not been accessed within a predetermined time period; and reclaiming the part of the data storage space to a space manager that allocates metadata storage spaces for the plurality of types of metadata.

2. The method of claim 1, further comprising:
determining whether a current allocation proportion of the first metadata storage space for the first type of metadata is greater than the first threshold proportion; and
in accordance with a determination that the current allocation proportion is less than or equal to the first threshold proportion, releasing the reserved metadata storage space.

3. The method of claim 1, wherein determining whether the first allocation proportion is greater than the first threshold proportion comprises:
determining whether a third allocation proportion of the storage space of the file system is greater than or equal to a second threshold proportion; and
in accordance with a determination that the third allocation proportion is greater than or equal to the second threshold proportion, determining whether the first allocation proportion is greater than the first threshold proportion.

4. The method of claim 3, further comprising:
determining whether the third allocation proportion of the storage space of the file system is less than or equal to a third threshold proportion, the third threshold proportion being less than the second threshold proportion; and
in accordance with a determination that the third allocation proportion is less than or equal to the third threshold proportion, releasing the reserved metadata storage space.

5. The method of claim 3, further comprising:
determining whether the third allocation proportion of the storage space of the file system is greater than or equal to a fourth threshold proportion, the fourth threshold proportion being greater than the second threshold proportion; and
in accordance with a determination that the third allocation proportion is greater than or equal to the fourth threshold proportion, releasing the reserved metadata storage space.

6. The method of claim 5, further comprising:
causing an alert to indicate that the storage space of the file system is limited.

7. The method of claim 5, wherein releasing the reserved metadata storage space comprises:
in accordance with a determination that the third allocation proportion is greater than or equal to the fourth threshold proportion, determining whether one of a plurality of parts of a data storage space allocated for the file system has not been accessed within a predetermined time period; and in accordance with a determination that the plurality of parts of the data storage space have been accessed within the predetermined time period, releasing the reserved metadata storage space.

8. The method of claim 1, further comprising:
allocating, by the space manager, a respective metadata storage space for each one of the plurality of types of metadata; and
allocating, by the space manager, in addition to the plurality of metadata storage spaces, a data storage space.

9. The method of claim 1, further comprising:
wherein the reserved metadata storage space is subsequently used to store only the first type of metadata; and
wherein the reserved metadata storage space is subsequently used to meet at least one space allocation request to store the first type of metadata.

10. The method of claim 1, further comprising:
determining the first priority of the first type of metadata based on a speed at which the metadata storage space reserved for the first type of metadata is consumed to store the first type of metadata; and
determining the second priority of the second type of metadata based on a speed at which the second metadata storage space reserved for the second type of metadata is consumed to store the second type of metadata.

11. A device of storage space balance for a file system, comprising:
a processor, and
a memory storing computer-executable instructions, the computer-executable instructions, when executed by the processor, causing the device to perform acts, the acts comprising:
determining whether a first allocation proportion of a first metadata storage space for a first type of metadata from among a plurality of types of metadata of the file system is greater than a first threshold proportion; and
in response to a determination that the first allocation proportion is greater than the first threshold proportion:
reserving a metadata storage space for the first type of metadata from a storage space of the file system, wherein reserving the metadata storage space for the first type of metadata includes:
determining whether a second allocation proportion of a second metadata storage space for a second type of metadata from among the plurality of types of metadata is greater than the first threshold proportion, in response to determining that the second allocation proportion is greater than the first threshold proportion, performing a comparison of a first priority of the first type of metadata to a second priority of the second type of metadata, and in response to determining that the first priority is higher than the second priority, prioritizing the reservation of the metadata storage space for the first type of metadata from the storage space of the file system over reservation of metadata storage space for the second type of metadata;

determining a part of a data storage space allocated for the file system, the part of the data storage space having not been accessed within a predetermined time period; and reclaiming the part of the data storage space to a space manager that allocates metadata storage spaces for the plurality of types of metadata.

12. The device of claim 11, wherein the acts further comprise:

determining whether a current allocation proportion of the first metadata storage space for the first type of metadata is greater than the first threshold proportion; and in accordance with a determination that the current allocation proportion is less than or equal to the first threshold proportion, releasing the reserved metadata storage space.

13. The device of claim 11, wherein determining whether the first allocation proportion is greater than the first threshold proportion comprises:

determining whether a third allocation proportion of the storage space of the file system is greater than or equal to a second threshold proportion; and in accordance with a determination that the third allocation proportion is greater than or equal to the second threshold proportion, determining whether the first allocation proportion is greater than the first threshold proportion.

14. The device of claim 13, wherein the acts further comprise:

determining whether the third allocation proportion of the storage space of the file system is less than or equal to a third threshold proportion, the third threshold proportion being less than the second threshold proportion;

in accordance with a determination that the third allocation proportion is less than or equal to the third threshold proportion, releasing the reserved metadata storage space.

15. The device of claim 13, wherein the acts further comprise:

determining whether the third allocation proportion of the storage space of the file system is greater than or equal to a fourth threshold proportion, the fourth threshold proportion being greater than the second threshold proportion;

in accordance with a determination that the third allocation proportion is greater than or equal to the fourth threshold proportion, releasing the reserved metadata storage space.

16. The device of claim 15, wherein the acts further comprise:

causing an alert to indicate that the storage space of the file system is limited.

17. The device of claim 15, wherein releasing the reserved metadata storage space comprises:

in accordance with a determination that the third allocation proportion is greater than or equal to the fourth threshold proportion, determining whether one of a plurality of parts of a data storage space allocated for the file system has not been accessed within a predetermined time period; and in accordance with a determination that the plurality of parts of the data storage space have been accessed, releasing the reserved metadata storage space.

18. A computer program product having a non-transitory computer readable medium which stores a set of instructions to provide storage space balance for a file system; the set of instructions, when carried out by computerized circuitry, causing the computerized circuitry to perform a method of:

determining whether a first allocation proportion of a first metadata storage space for a first type of metadata from among a plurality of types of metadata of the file system is greater than a first threshold proportion; and in response to a determination that the first allocation proportion is greater than the first threshold proportion:

reserving a metadata storage space for the first type of metadata from a storage space of the file system, wherein reserving the metadata storage space for the first type of metadata includes:

determining whether a second allocation proportion of a second metadata storage space for a second type of metadata from among the plurality of types of metadata is greater than the first threshold proportion, in response to determining that the second allocation proportion is greater than the first threshold proportion, performing a comparison of a first priority of the first type of metadata to a second priority of the second type of metadata, and in response to determining that the first priority is higher than the second priority, prioritizing the reservation of the metadata storage space for the first type of metadata from the storage space of the file system over reservation of metadata storage space for the second type of metadata;

determining a part of a data storage space allocated for the file system, the part of the data storage space having not been accessed within a predetermined time period; and reclaiming the part of the data storage space to a space manager that allocates metadata storage spaces for the plurality of types of metadata.

* * * * *